US009829595B2

(12) United States Patent
Goujon et al.

(10) Patent No.: US 9,829,595 B2
(45) Date of Patent: Nov. 28, 2017

(54) PARTICLE MOTION SENSOR-BASED STREAMER POSITIONING SYSTEM

(75) Inventors: Nicolas Goujon, Oslo (NO); Svein Arne Frivik, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 1830 days.

(21) Appl. No.: 12/367,263

(22) Filed: Feb. 6, 2009

(65) Prior Publication Data

US 2010/0202249 A1 Aug. 12, 2010

(51) Int. Cl.
*G01V 1/38* (2006.01)

(52) U.S. Cl.
CPC .................................. *G01V 1/3835* (2013.01)

(58) Field of Classification Search
CPC . G01V 1/38; G01V 1/16; G01V 1/286; G01V 1/3817; G01V 1/3835; G01S 5/30
USPC ........... 367/17, 19, 20, 24, 15, 16, 21; 702/1
See application file for complete search history.

(56) References Cited

U.S. PATENT DOCUMENTS

| | | | |
|---|---|---|---|
| 5,668,775 A | 9/1997 | Hatteland | |
| 6,205,403 B1 * | 3/2001 | Gaiser et al. | 702/14 |
| 6,353,577 B1 | 3/2002 | Orban et al. | |
| 6,412,592 B1 | 7/2002 | Meynier | |
| 6,839,302 B2 | 1/2005 | Austad et al. | |
| 6,961,283 B2 | 11/2005 | Kappius et al. | |
| 7,050,355 B2 * | 5/2006 | Robertsson et al. | 367/19 |
| 7,292,504 B2 | 11/2007 | Luc | |
| 7,379,386 B2 | 5/2008 | Muyzert et al. | |
| 2005/0018537 A1 | 1/2005 | Welker et al. | |
| 2006/0133202 A1 * | 6/2006 | Tenghamn | 367/24 |
| 2007/0195648 A1 | 8/2007 | Borgen et al. | |
| 2008/0025146 A1 * | 1/2008 | Welker | 367/20 |
| 2009/0003132 A1 | 1/2009 | Vassallo et al. | |
| 2009/0245019 A1 * | 10/2009 | Falkenberg et al. | 367/17 |

OTHER PUBLICATIONS

PCT Search Report, dated Oct. 4, 2010, Application No. PCT/US2010/023186.
Dellinger, et al., Horizontal Vector Infidelity Correction by General Linear Transform, SEG International Exposition Annual Meeting, 2001.
PCT Search Report, dated Oct. 4, 2010, Application No. PCT/US2010/023084.

* cited by examiner

Primary Examiner — Daniel L Murphy

(57) ABSTRACT

A technique includes disposing a particle motion sensor on a spread of at least one streamer and using the particle motion sensor to acquire a measurement of a signal, which is transmitted from an acoustic transmitter. The technique includes determining a heading of the particle motion sensor based at least in part on the measurement.

12 Claims, 8 Drawing Sheets

PARTICLE MOTION SENSOR-BASED STREAMER POSITIONING SYSTEM

BACKGROUND

The invention generally relates to a particle motion sensor-based streamer position system.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes disposing a particle motion sensor on a spread of at least one streamer and using the particle motion sensor to acquire a measurement of a signal, which is transmitted from an acoustic transmitter. The technique includes determining a heading of the particle motion sensor based at least in part on the measurement.

In another embodiment of the invention, a technique includes disposing a particle motion sensor on a spread of at least one streamer and using the particle motion sensor to acquire a measurement of a signal, which is transmitted from an acoustic transmitter. The technique includes determining a first value, which is indicative of a slope of the sensor based at least in part of the measurement. The technique also includes, independently from the determination of the first value, measuring a second value, which is indicative of the slope of the sensor. The technique includes determining a correction factor to apply to an acoustic ranging measurement based on the first and second values.

In another embodiment of the invention, an apparatus includes an interface and a processor. The interface receives data, which are indicative of a measurement of a signal transmitted from an acoustic transmitter. The measurement is acquired by a particle motion sensor, which is disposed on a spread of at least one streamer. The processor processes the data to determine a heading of the particle motion sensor based at least in part on the measurement.

In yet another embodiment of the invention, an apparatus includes an interface and a processor. The interface receives first data, which are indicative of a measurement of a signal transmitted from an acoustic transmitter. The measurement is acquired by a particle motion sensor, which is disposed on a spread of at least one streamer. The interface receives second data, which are indicative of a directly measured slope of the particle motion sensor. The processor processes the first data to estimate a slope of the sensor based at least in part on the measurement, which is acquired by the particle motion sensor. The processor determines a correction factor to apply to an acoustic ranging measurement based on the estimated and directly measured slopes.

Advantages and other features of the invention will become apparent from the following drawing, description and claims.

DETAILED DESCRIPTION

Figure 1:
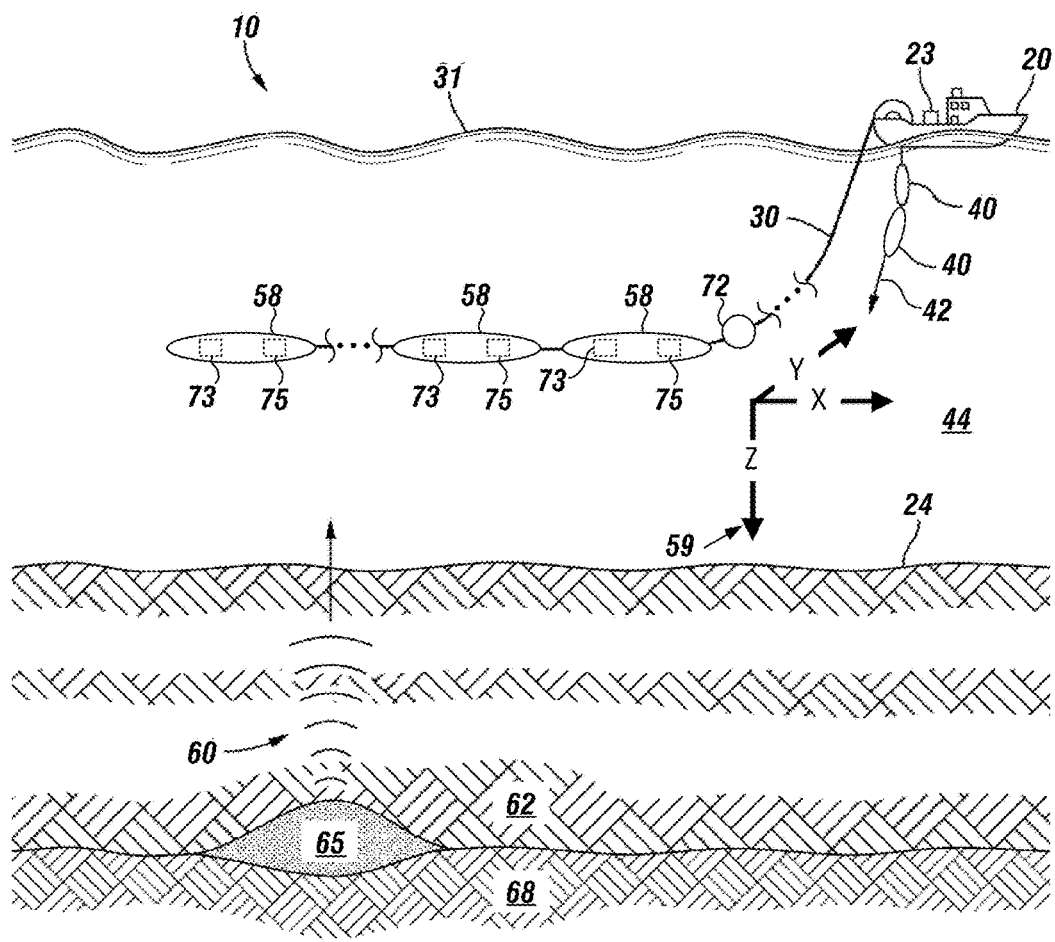
FIG. 1 is a schematic diagram of a marine-based seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 58, which may include, depending on the particular embodiment of the invention, hydrophones (as one non-limiting example) to acquire pressure data or multi-component sensors. For embodiments of the invention in which the sensor units 58 contain multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary, or free surface 31.

The seismic sensors generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor may provide a trace, which corresponds to a measure of a pressure wavefield by its hydrophone; and the sensor may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

The seismic streamers 30 may be positioned using an acoustic ranging system. More specifically, in accordance with some embodiments of the invention, the streamers 30 include acoustic pingers, or transmitters, 72 (one transmitter 72 being depicted in FIG. 1), which emit, or transmit, acoustic signals. The acoustic signals, in turn, results in pressure pulses, often called "chirps." By sensing the acoustic signals at various points along the streamers 30, distances may be calculated between these points and the acoustic transmitters 72.

As a more specific example, in accordance with some embodiments of the invention, hydrophones of the seismic sensor units 58 may be used to sense the transmitted acoustic signals. The received acoustic signals are cross-correlated with the transmitted acoustic signals, and for each acoustic signal, a time delay is determined between when the acoustic signal was transmitted and the acoustic signal was received. Thus, the delay represents the propagation time of the acoustic signal. Given the sound of speed in water, the time delay may be used to calculate the distance between the acoustic transmitters and receiver.

The frequencies of the acoustic signals may be above the seismic bandwidth, such as frequencies from 500 Hertz (Hz) to several tens of kilohertz (kHz), depending on the particular embodiments of the invention. As a more specific example, in accordance with some embodiments of the invention, the acoustic ranging system may be an Intrinsic Ranging by Modulated Acoustics (IRMA) subsystem that is described in, for example, U.S. Pat. No. 5,668,775.

In general, acoustic ranging using merely hydrophones as the acoustic sensors does not provide information that by itself is sufficient to accurately estimate the local heading at each hydrophone location. Instead, the local heading typically is estimated by fitting a curve on the different receiver locations measured along the streamer. The above-described approach of using only the hydrophones as the acoustic sensors also may be subject to noise, in that in the case of a low signal-to-noise ratio (SNR), it may be difficult to extract the time delays from the cross-correlated data. Additionally, in the case of non-uniform sound velocity in the water column, the acoustic signals may not propagate in straight lines, thereby resulting in an overestimation of the distances between the acoustic transmitters and receivers.

A hydrophone measures the same signal independently of its orientation. Therefore, the hydrophone does not yield the local orientation of the streamer near the hydrophone. In accordance with embodiments of the invention described herein, particle motion sensors are used instead of, or in addition to, the hydrophones to 1.) determine streamer positions; and 2.) determine additional information about the local orientation of the streamer 30. Furthermore, as described below, the information gained by the particle motion sensors may be combined with acoustic ranging measurements to more accurately determine distances between the acoustic transmitter and point along the streamer.

Thus, in accordance with embodiments of the invention described herein, each seismic sensor unit 58 includes at least one particle motion sensor 73 (see FIG. 1). In accordance with some embodiments of the invention, the particle motion sensor 73 senses a particle motion (such as an acceleration, for example) along a particular sensitive axis 59, and in accordance with some embodiments of the invention, the particle motion sensor 73 senses particle motion components along more than one sensitive axis. For example, in accordance with embodiments of the invention, the particle motion sensor 73 may be a three axis accelerometer, which provides data indicative of sensed acceleration along the inline (x), crossline (y) and depth (z) axes.

In general, the particle motion measurements acquired by the particle motion sensors 73 indicate the directions of the acoustic ranging signals, which constitutes additional information that may be used to improve the quality of streamer position estimation.

Figure 2:
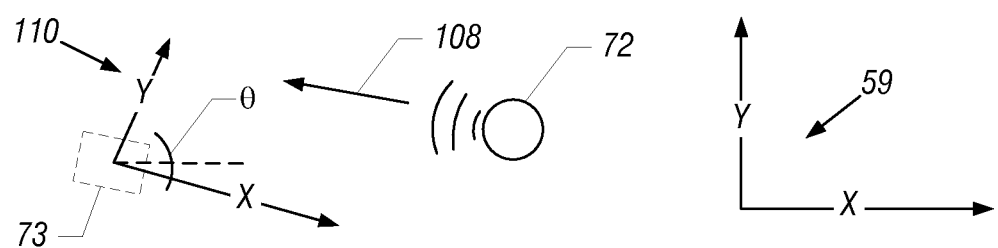
FIG. 2 is an illustration of a technique to determine a heading of a streamer cable near a particle motion sensor according to an embodiment of the invention.

FIG. 2 depicts an exemplary orientation of a particle motion sensor 73 in the inline-crossline (x-y) plane for purposes of illustrating one application that uses the particle motion measurements to acquire information about the headings of the streamer(s) 30 at different points. Referring to FIG. 2, an acoustic transmitter 72 transmits an acoustic signal 108 that is sensed by the particle motion sensor 73. As shown in FIG. 2, the local coordinate reference space, as shown local coordinate axes 110, are not aligned with a global reference system, depicted by the global axes 59. Thus, the local crossline and inline axes 110 are rotated by a heading (called "θ" herein) relative to the global axes 59.

The direction of the acoustic signal 108 relative to the global axes 59 is known. Therefore, the particle motion sensor's measurement of the acoustic signal's direction yields information regarding the orientation of the local axes 110 relative to the global axes 59 and also yields information regarding the heading θ of the particle motion sensor 73. As such, this information may be used to determine the heading of the streamer cable 30 at or near the particle motion sensor 73.

Figure 3:
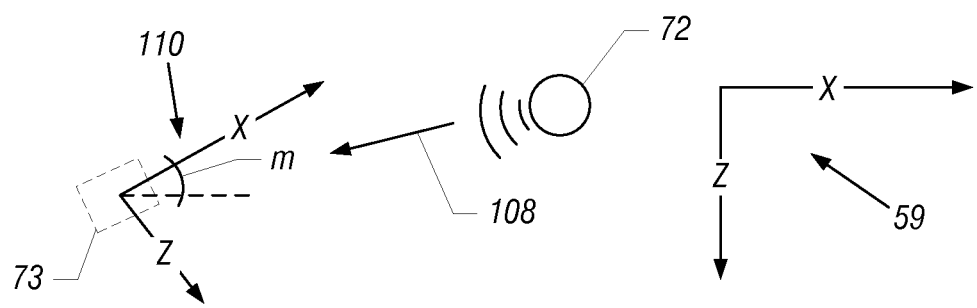
FIG. 3 is an illustration of a technique to determine a slope of a streamer cable near a particle motion sensor according to an embodiment of the invention.

Referring to FIG. 3, likewise, assuming a three axis particle motion sensor, the particle motion measurement yields information about the direction of the acoustic signal 108 in the x-z plane for purposes of determining the slope (called "m" in FIG. 3) of the streamer cable 30 near or at the particle motion sensor 73 relative to the global axes 59.

For a two axis particle motion sensor (such as an accelerometer), the heading of the streamer cable 30 near or at the particle motion sensor may be determined using the particle motion measurement, and the slope of the cable at the sensor location may be determined by, for example, using an inclinometer, which may be disposed (as a non-limiting example) in the seismic sensor unit 58 (see FIG. 1). However, for a three axis particle motion sensor (an accelerometer, for example), both the heading θ and the slope m may be determined using the 3-D particle motion measurement.

Figure 4:
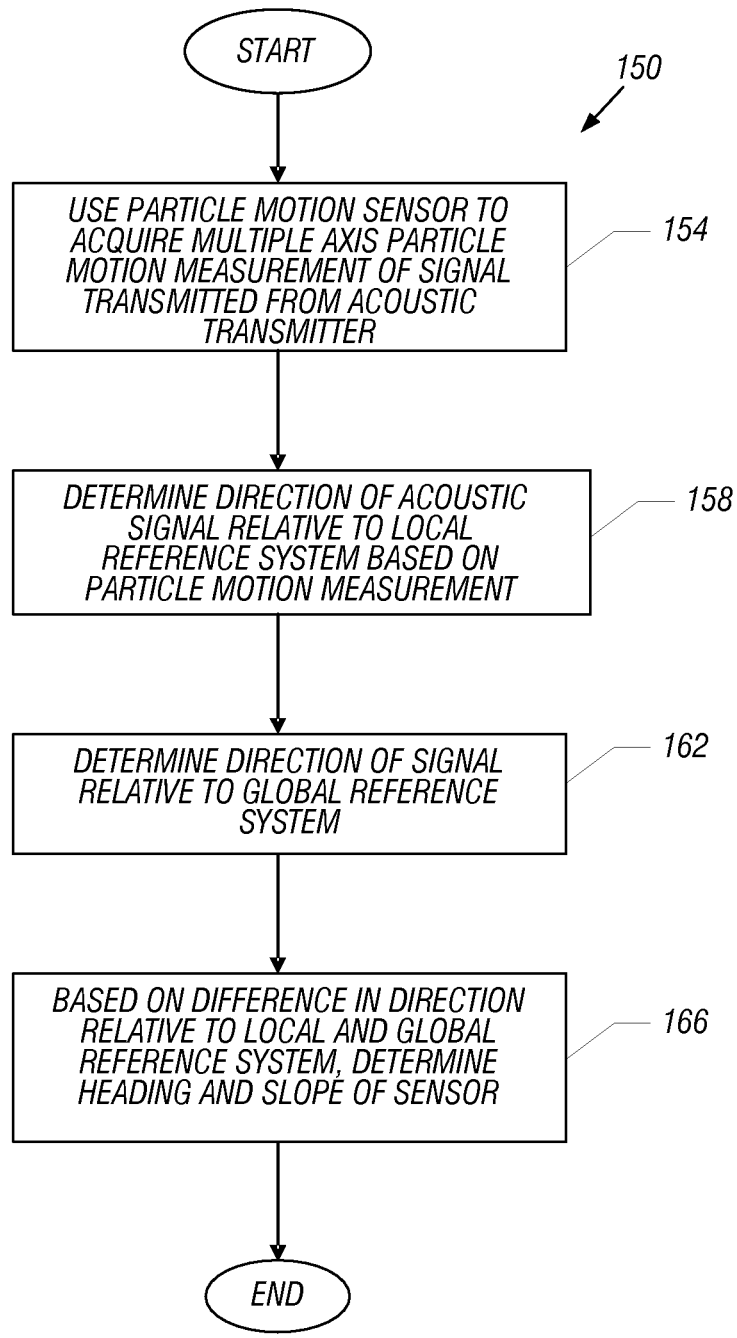
FIGS. 4 and 5 are flow diagrams depicting techniques to determine the heading and slope of a streamer cable near a particle motion sensor using particle motion measurements according to embodiments of the invention.

To summarize, a technique 150, which is depicted in FIG. 4 may be used in accordance with some embodiments of the invention for purposes of determining the heading θ and slope m of a seismic streamer cable near or at a particle motion sensor. Pursuant to the technique 150, a particle motion sensor is used to acquire a multiple axis particle motion measurement of an acoustic signal, which is transmitted from an acoustic transmitter. Based on this particle motion measurement, a direction of the acoustic signal relative to a local reference system is determined, pursuant to block 158. The technique 150 also includes determining (block 162) the direction of the acoustic signal relative to a global reference system. The heading and slope of the seismic streamer cable near or at the particle motion sensor may then be determined (block 166) based at least in part on the difference in direction relative to the local and global reference systems.

Figure 6:
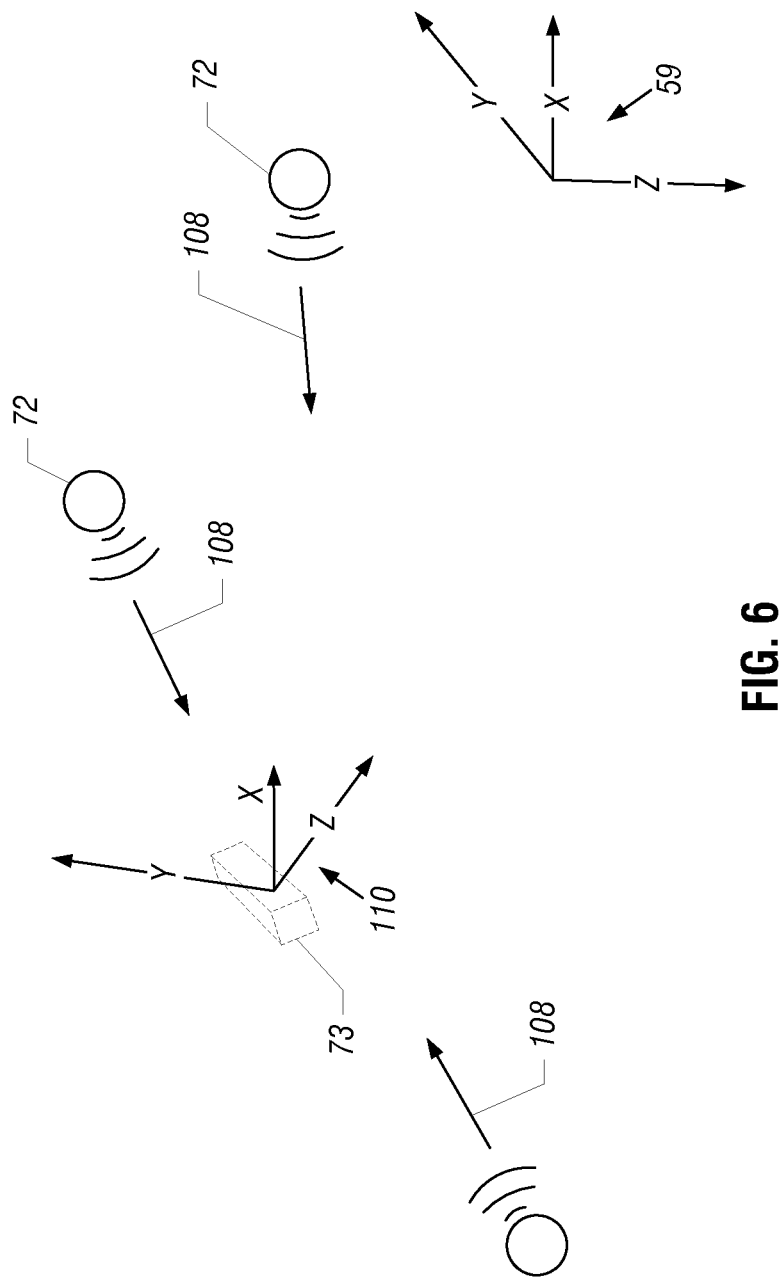
FIG. 6 is an illustration of a technique to determine a heading and slope of a streamer cable near a particle motion sensor using particle motion measurements along a single axis according to an embodiment of the invention.

Other variations are contemplated and are within the scope of the appended claims. For example, in accordance with some embodiments of the invention, the heading θ and slope m may be determined from a single axis particle motion sensor that measures the directions of multiple acoustic signals that are transmitted by acoustic transmitters, which are disposed at different locations, as depicted in FIG. 6. The measured amplitudes of the measured particle motion component along a particular sensitive axis are used to determine the orientation of the sensitive axis to the global axes 59; and using this determination, the heading θ and slope m may be determined.

Figure 5:
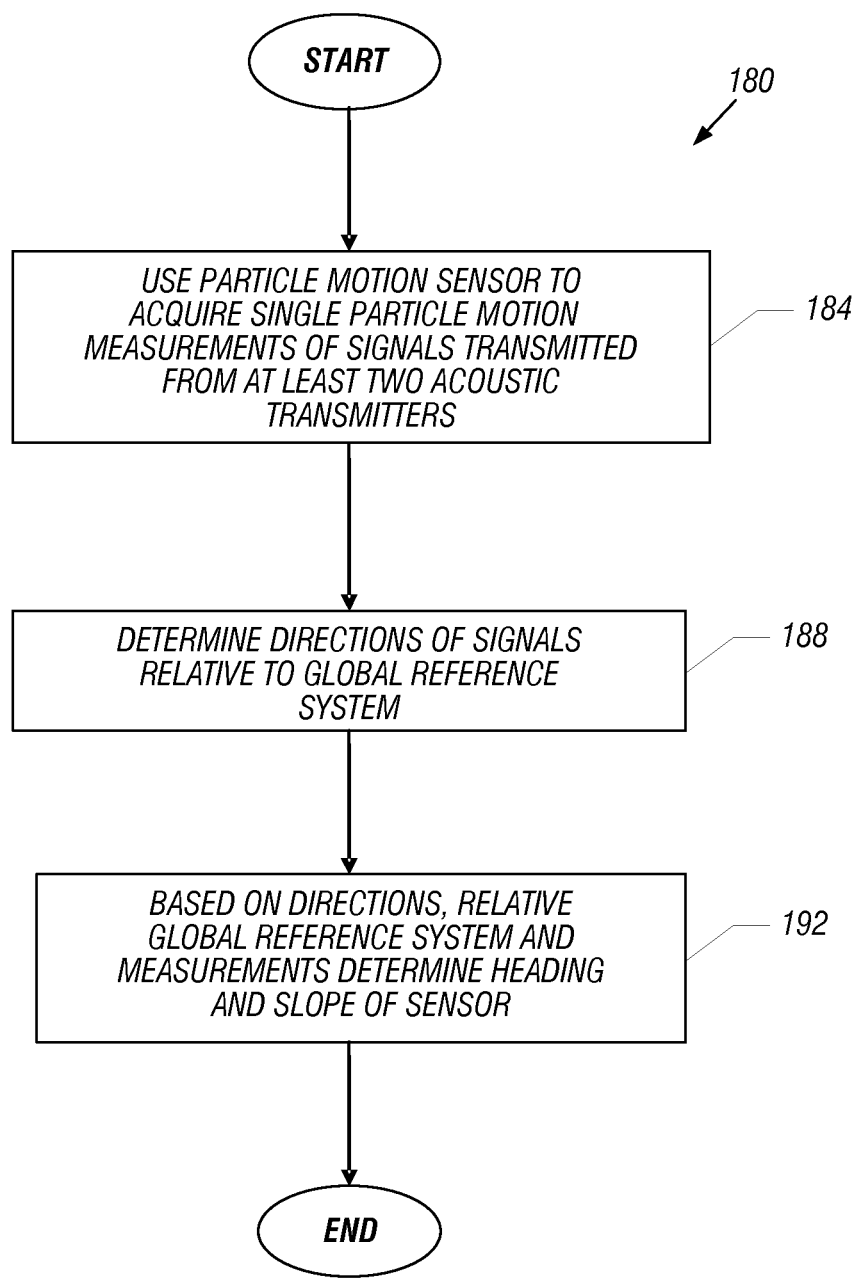

FIG. 5 summarizes other embodiments of the invention. Referring to FIG. 5, pursuant to a technique 180, a particle motion sensor is used to acquire single axis particle motion measurements of signals that are transmitted from multiple (at least two) acoustic transmitters, pursuant to block 184. The technique 180 includes determining (block 188) the directions of the signals relative to the global reference system and based on the directions relative to the global reference system and the measurements, determining the heading and slope of the cable near or at the particle sensor location, pursuant to block 192.

Figure 8:
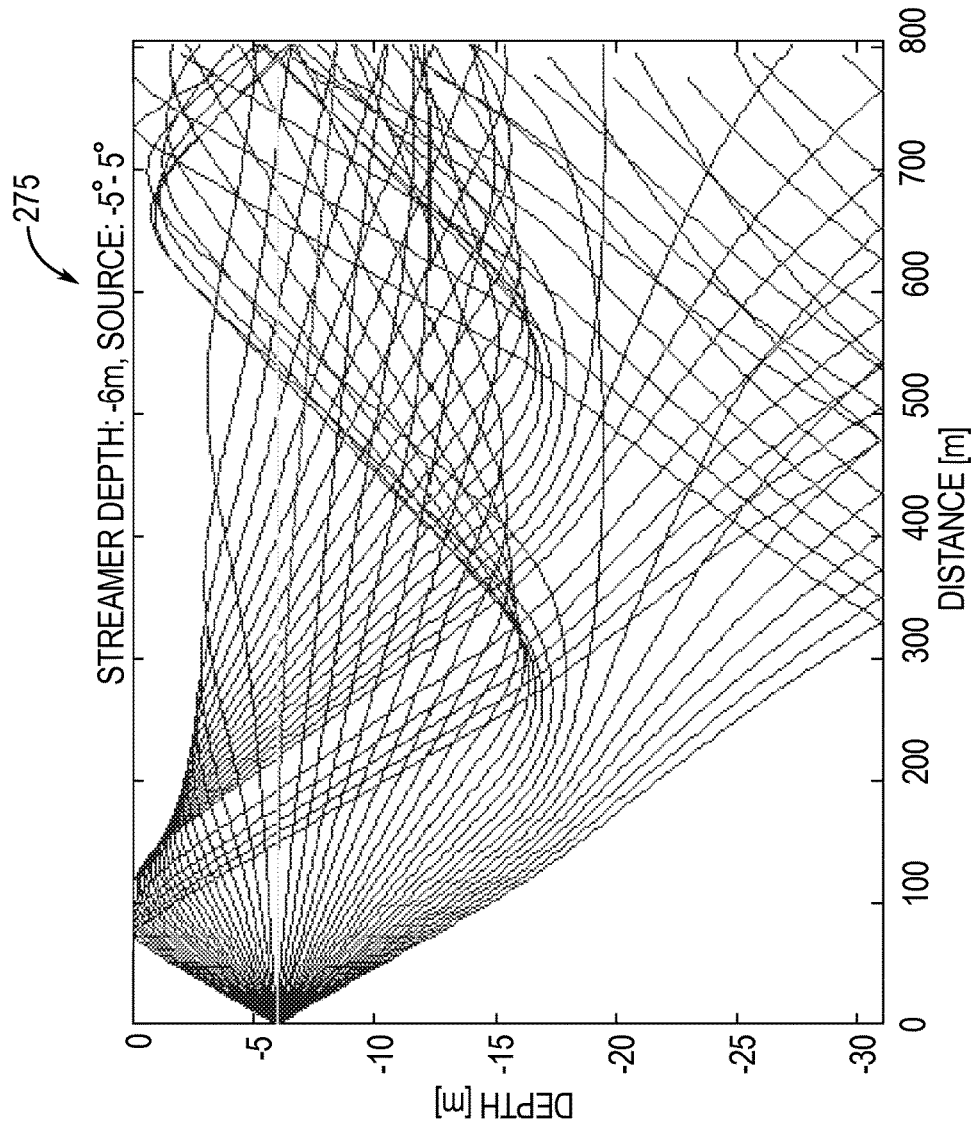
FIG. 8 is an illustration of ray bending as a result of a changing sound speed profile.
Figure 7:
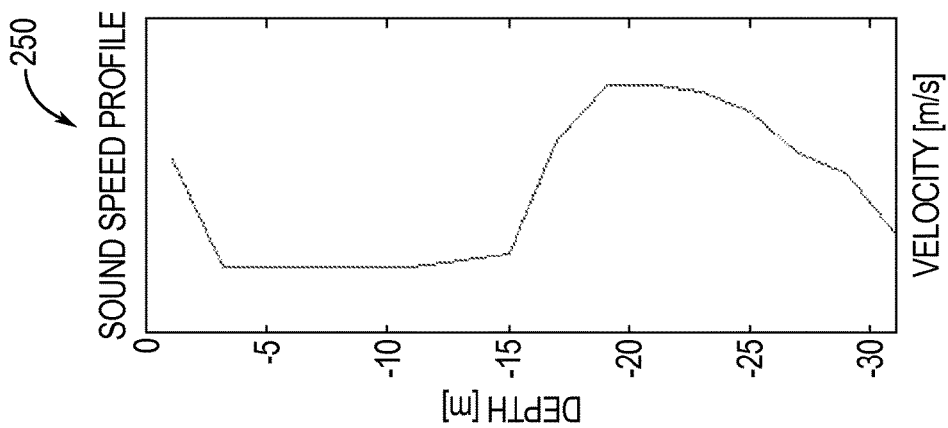
FIG. 7 depicts an exemplary speed profile of sound in water.

Oceanographical parameters, such as temperature and salinity, typically change laterally and with depth. Generally, these parameters have a more pronounced variation with depth and hence, there are typically several layers of water that have different parameters in the ocean. Each of these layers has a different associated speed of sound, as depicted by an exemplary sound speed profile 250 in FIG. 7. In an environment in which the speed of sound is changing with depth, the sound does propagate along straight lines, but rather, rays bend according to the sound speed profile, as illustrated in speed profile 275 that is depicted in FIG. 8.

From a particle motion measurement perspective, the relatively small lateral change in the speed of sound means that the amplitude ratios between the inline and crossline measurements are usually not affected. Therefore, the headings θ may be still accurately determined, even if the speed of sound is not accounted for in the lateral direction. In the case of a sound velocity that varies significantly in the vertical direction, however, the direction of the incoming acoustic signals may not be relatively accurate for purposes of determining the various slopes of the streamer cable, as the rays of sound are significantly bent in the vertical plane. However, as set forth below, the information obtained in the particle motion measurements may be used to improve the quality of the acoustic ranging measurements and hence, improve the information regarding the positioning of the streamer cable.

If the acoustic signal does not propagate in a straight line, the distance between the acoustic transmitter and the sensor that senses the acoustic signal is overestimated when the measured time delay is converted to distance, if a straight propagation path is assumed. However, these ranging measurements may be corrected as follows.

In accordance with embodiments of the invention, the actual slopes of the streamer cable are measured with inclinometers 75 (see FIG. 1). In general, each inclinometer 75 may be located near, or co-located with, a particle motion sensor 73 in a seismic sensor unit 58 in accordance with some embodiments of the invention. By measuring the actual slope of the cable with an inclinometer and comparing the actual slope measurement with the slope that is determined via the particle motion measurement techniques that are disclosed herein, a calculation may be made regarding the degree in which the ray of sound was bent. Therefore, based on this calculation, a correction factor may be determined, which when applied to the acoustic ranging measurement (determined assuming a straight propagation path) corrects the measurement to account for the bending of the acoustic ray.

Figure 9:
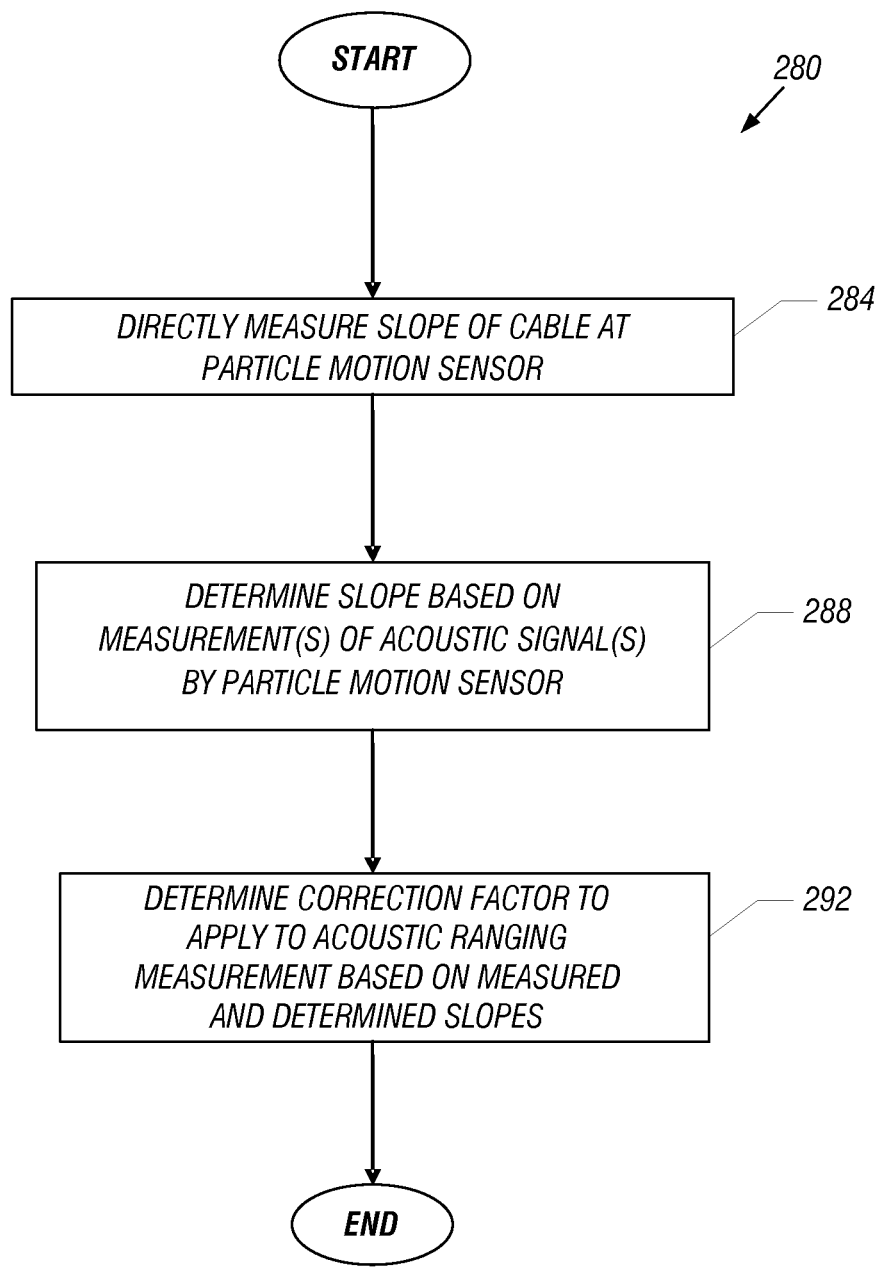
FIG. 9 is a flow diagram depicting a technique to determine a correction factor to apply to acoustic ranging measurements according to an embodiment of the invention.

To summarize, a technique 280 that is depicted in FIG. 9 may be used in accordance with some embodiments of the invention for purposes of correcting ranging measurements. Pursuant to the technique 280, the slope of the cable is directly measured at the particle motion sensor, pursuant to block 284. The cable slope at the particle motion sensor is determined (block 288) based on the particle motion measurement(s) of acoustic signal(s) by the particle motion sensor. A correction factor may then be determined, pursuant to block 292, to apply to the acoustic ranging measurement based on the measured and determined slopes.

When mounted in a cable, vertical motion sensors, such as accelerometers, might not always record the sound pressure. For example, the signal recorded by an accelerometer inline with the streamer cable (i.e., along the inline or x axis) might have a significantly attenuated amplitude. When comparing the amplitudes on the different axes to determine the direction of the signal, the attenuated amplitudes may introduce significant errors. However, if the inline signal is attenuated, it is likely to be attenuated in a systematic fashion. Therefore, the attenuation may be modeled and corrected by a nominal correction factor, which may be applied to all of the measured inline data. It is noted that the correction factor may be determined by measurements or modeling.

The correction factor may also be derived from the data, using, for example, the method described in Joe Dellinger et al., *Horizontal Vector Infidelity Correction By General Linear Transform*, pp. 865-868, SEG Technical Program Expanded Abstracts (2001).

Figure 10:
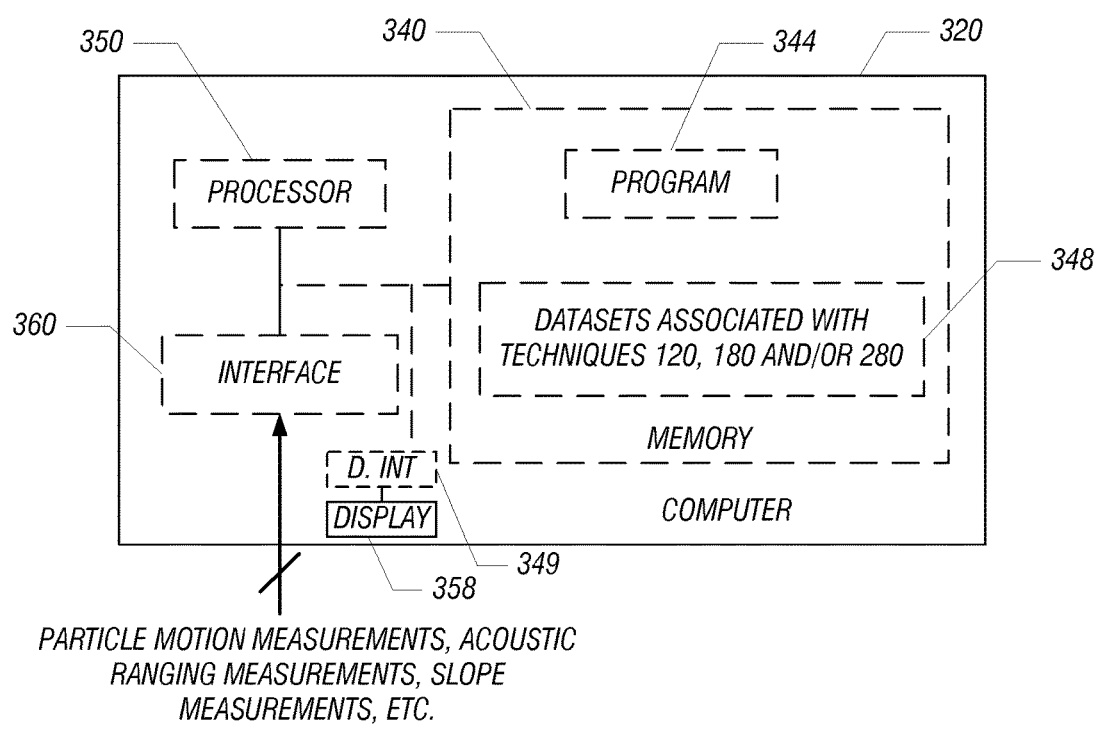
FIG. 10 is a schematic diagram of a data processing system according to an embodiment of the invention.

Referring to FIG. 10, in accordance with some embodiments of the invention, a data processing system 320 contains a processor 350 that processes acquired particle motion measurement, acoustic ranging and/or slope measurement data to perform at least some parts of one or more of the techniques that are disclosed herein for such purposes (as non-limiting examples) of using particle motion measurements to determine headings and slopes at positions along streamer cables; determining directions of incoming acoustic waves relative to reference systems; determining directions of acoustic waves relative to global reference systems; determining orientations of local reference systems based at least in part on particle motion measurements; determining correction factors to apply to acoustic ranging measurements due to ray bending; etc.

In accordance with some embodiments of the invention, the processor 350 may be formed from one or more microprocessors and/or microcontrollers. As non-limiting examples, the processor 350 may be located on a streamer 30 (see FIG. 1), located on the vessel 20 (see FIG. 1), distributed among multiple streamers 30; distributed among multiple vessels 20; located at one or more land-based processing facilities, etc., depending on the particular embodiment of the invention.

The processor 350 may be coupled to a communication interface 360 for purposes of receiving such data as particle motion measurements, acoustic ranging measurements, slope measurements, etc. As examples, the communication interface 360 may be a Universal Serial Bus (USB) interface, a network interface, a removable media (such as a flash card, CD-ROM, etc.) interface or a magnetic storage interface (IDE or SCSI interfaces, as examples). Thus, the communication interface 360 may take on numerous forms, depending on the particular embodiment of the invention.

In accordance with some embodiments of the invention, the communication interface 360 may be coupled to a memory 340 of the system 320 and may store, for example, various input and/or output datasets involved in the determination of acoustic ranging measurements, corrected acoustic ranging measurements, slopes, headings, coordinate transformations, signal directions relative to local and global reference systems; etc. The memory 340 may store program instructions 344, which when executed by the processor 350, may cause the processor 350 to perform various tasks of one or more of the techniques and systems that are disclosed herein, such as the techniques 150, 180 and/or 280; and the system 320 may display preliminary, intermediate and/or final results obtained via the technique(s)/system(s) on a display 358, which is coupled to the system 320 via a display interface 349 in accordance with some embodiments of the invention.

Other variations are contemplated and are within the scope of the appended claims. For example, the techniques and system that are disclosed herein may be applied to a streamer spread other than a spread of seismic streamers. For example, in accordance with some embodiments of the invention, the techniques and systems that are disclosed herein may be applied to a spread of streamers, which contain electromagnetic (EM) sensors.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    disposing a particle motion sensor on a spread of at least one towed streamer;
    using the particle motion sensor to acquire a measurement of a signal transmitted from an acoustic transmitter, the measurement representing orthogonal particle motions; and
    based at least in part on the orthogonal particle motions, determining a heading of at least one measurement axis of the particle motion sensor, wherein determining the heading comprises:
        based at least in part on the measurement, determining a first direction of the signal in a local reference system; and
        determining the heading based at least in part on the first direction and a second direction of the signal in a global reference system.

2. The method of claim 1, further comprising:
    using the particle motion sensor to acquire at least one additional measurement of a signal transmitted from at least one additional acoustic transmitter, wherein the act of determining is further based at least in part on said at least one additional measurement.

3. The method of claim 1, further comprising:
determining a slope of the at least one streamer based at least in part on the measurement.

4. The method of claim 1, wherein the act of determining comprises assuming a substantially straight line of sound propagation between the acoustic transmitter and the sensor.

5. The method of claim 1, wherein the act of disposing comprises disposing electromagnetic sensors or seismic sensors on the spread.

6. The method of claim 1, further comprising:
towing the spread.

7. The method of claim 1, further comprising:
disposing additional particle motion sensors on the spread;
using said additional particle motion sensors to acquire measurements of signals transmitted from additional acoustic transmitters; and
based at least in part of the measurements acquired by said additional particle motion sensors, determining headings of the additional particle motion sensors.

8. An apparatus comprising
an interface to receive data indicative of a measurement of a signal transmitted from an acoustic transmitter, the measurement representing at least two orthogonal particle motions acquired by a particle motion sensor disposed on a spread of at least one towed streamer; and
a processor to process the data to:
based at least in part on the particle motions, determine a first direction of the signal in a local reference system; and
determine the heading based at least in part on the first direction and a second direction of the signal in a global reference system.

9. The apparatus of claim 8, wherein the processor is further adapted to determine a slope of the at least one streamer based at least in part on the measurement.

10. The apparatus of claim 8, further comprising:
a vessel to tow the spread of at least one streamer.

11. The apparatus of claim 8, wherein the processor is disposed on the streamer.

12. The apparatus of claim 8, wherein the spread comprises electromagnetic sensors or seismic sensors.

* * * * *